April 13, 1926.
J. W. PAGE
1,580,673
EXCAVATING SHOVEL
Filed May 18, 1925
2 Sheets-Sheet 1
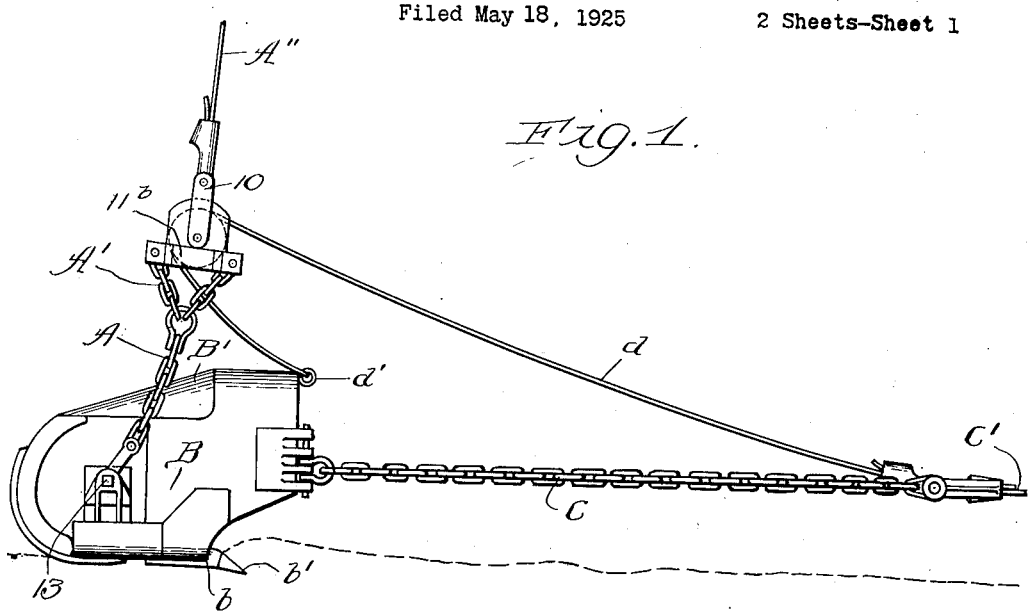
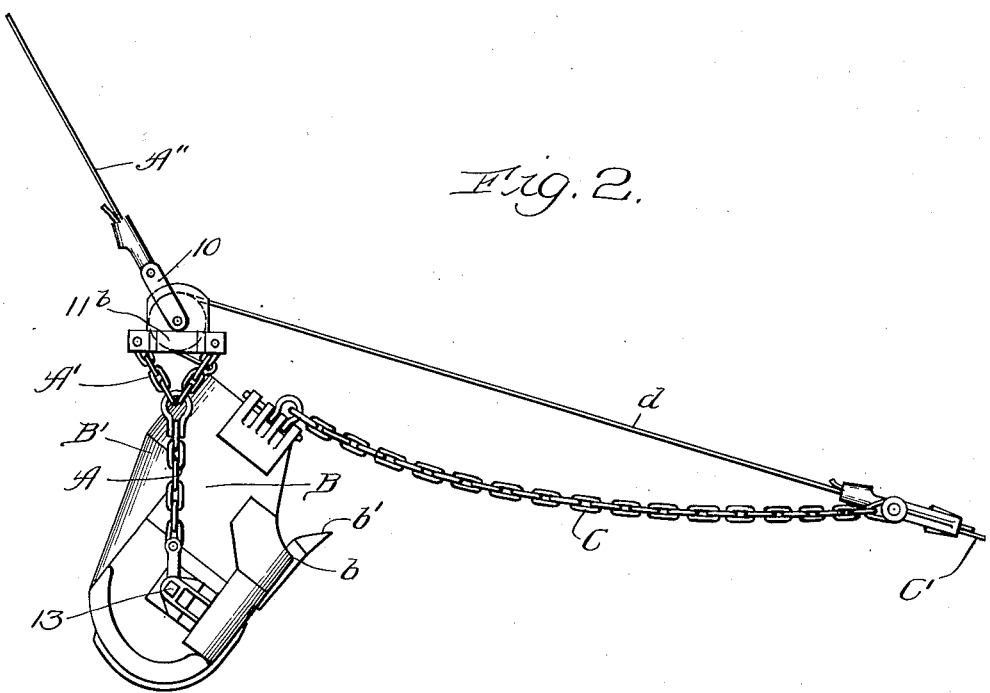
Inventor:
John W. Page,
By Byrnforth, Lee, Chritton & Wiles,
Attys.

April 13, 1926.  
J. W. PAGE  
EXCAVATING SHOVEL  
Filed May 18, 1925
1,580,673
2 Sheets-Sheet 2
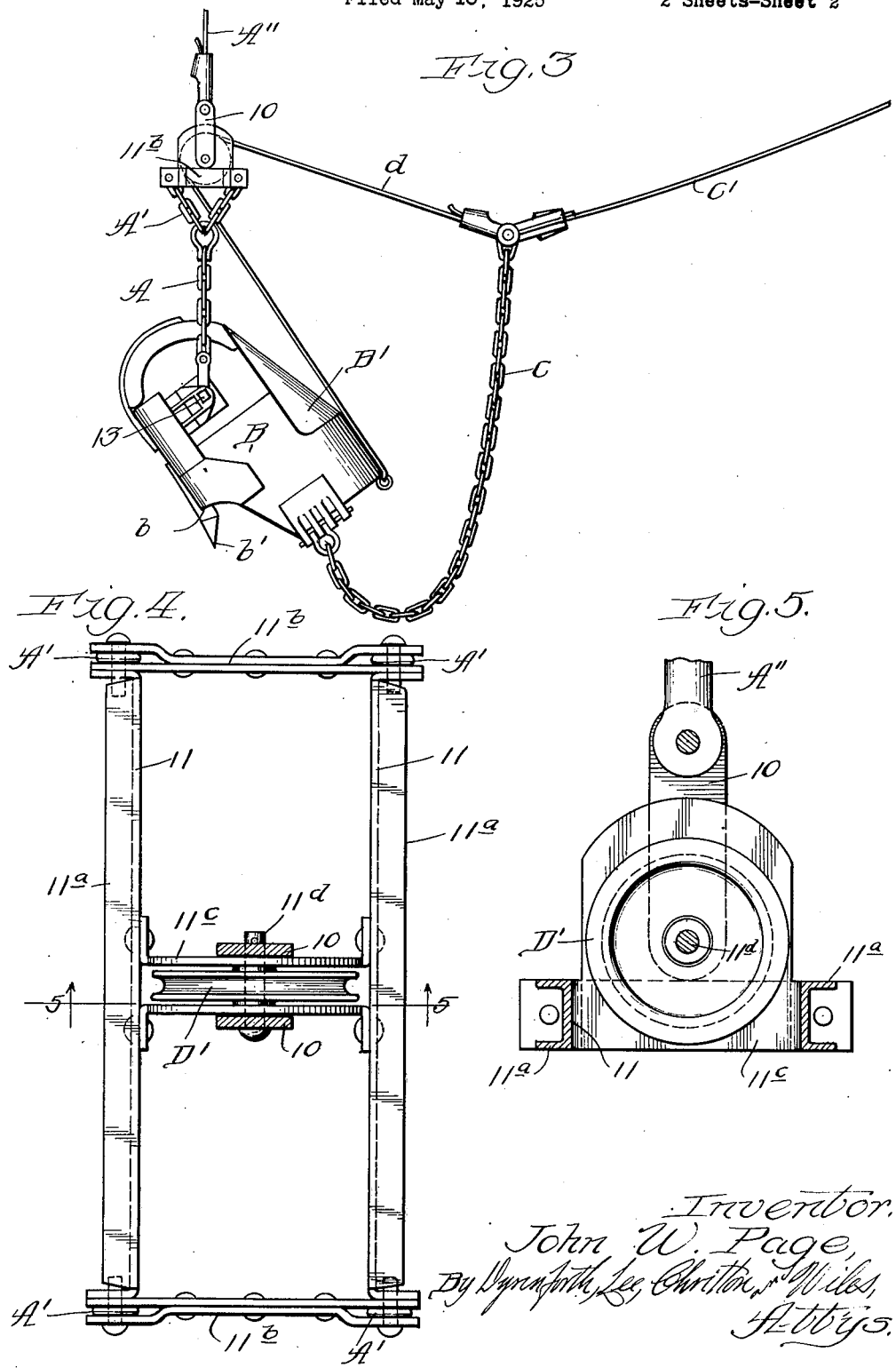

Patented Apr. 13, 1926.

1,580,673

UNITED STATES PATENT OFFICE.

JOHN W. PAGE, OF CHICAGO, ILLINOIS.

EXCAVATING SHOVEL.

Application filed May 18, 1925. Serial No. 31,052.

*To all whom it may concern:*

Be it known that I, JOHN W. PAGE, a citizen of the United States, residing at Chicago, in the county of Cook and State of Illinois, have invented a new and useful Improvement in Excavating Shovels, of which the following is a specification.

This invention relates to improvements in excavating shovels. One of the features of my improved device is that the shovel is so constructed that solid or liquid substances can be handled. For example, my device is so made that soft and flowing mud, or other substances in a liquid or substantially liquid condition can be excavated. My shovel is so constructed that after it receives a load or charge of material and is lifted, it turns through an angle of substantially 90° so that its open end is up. The shovel is made really in the form of a bucket so that, in fact, it can be truly said of it that it is both a shovel and a bucket. As it is being loaded it is dragged through the material in a substantially horizontal direction with the open end forward and thus acts as a shovel. As soon as it is lifted, it rotates until the open end is substantially at the top, thus resembling a bucket which will retain liquid or semi-liquid substances.

Other features and advantages of my improved shovel will appear more fully as I proceed with my specification.

In that form of device embodying the features of my invention shown in the accompanying drawings, Figure 1 is a view in side elevation of the shovel showing the same as it is being loaded, Figure 2 shows the shovel up in the air with a load of material, Figure 3 shows the shovel in dumping position, Figure 4 is a top plan view of the bail forming a part of the shovel, and Figure 5 is a view taken as indicated by the line 5 of Fig. 4.

The excavating shovel herein shown is an improvement on the shovel shown in my Patent No. 758,380, granted April 26, 1904, and in my Patent No. 916,772, granted March 30, 1909, and the particular features of difference between this shovel and the shovels shown in said patents will be particularly pointed out herein.

Referring to the drawings, A indicates chains pivotally attached at 13 to the sides of the shovel at their lower ends. The upper end of each chain A is attached to the ends of two shorter chains A' which, in turn, are joined, as shown, to the end of the bail 11 shown in Fig. 4. The bail 11 consists of two parallelly arranged angle irons $11^a$, connected at their ends by the cross members $11^b$ to form a stiff rectangular frame. The upper ends of the two short chains A' at each side of the shovel are joined to one end of the bail by attachment at the corners of the rectangular frame.

B indicates the shovel proper which is pivotally secured to the lower ends of the chains A, the points of connection between the chains A and the shovel being behind the center of gravity of the shovel, so that when released the shovel will swing down and dump its contents, as is particularly set forth in Patent No. 758,380, granted April 26, 1904, referred to above. The shovel has, at its front lower corner, a cutting edge $b$ provided with teeth $b'$ to assist in passing through the material to be dug.

To the front edges of the shovel are attached the chains C which perform the same function as the two small hauling ropes C of my Patent No. 758,380. The hauling chains C are connected at their forward ends to a hauling rope C'.

The bail 11 is provided with two cross members $11^c$ connecting the angle irons $11^a$ substantially midway between their ends. Mounted between the members $11^c$ on the pin $11^d$ is a sheave D'. A'' indicates a lifting cable having its lower end attached to a clevis 10 which, in turn, is attached to the pin $11^d$ mounted on the bail 11.

$d$ indicates a holding rope, one end of which is secured to the upper forward part of the shovel as indicated by $d'$. The holding rope $d$, from the point of attachment to the shovel at $d'$ runs over the sheave D' and has its other end fastened at the point of attachment of the hauling chains C to the main hauling rope C'.

In some respects my shovel works the same as the shovel of my patents referred to, but it is to be noted that as the shovel is lifted it does not remain in a horizontal position but rotates through substantially 90°, the front end being thus elevated, as shown in Fig. 2. It is believed that the operation will be understood. When it is desired to excavate with my shovel, the hauling rope C' can be drawn in by a suitable engine, and the shovel will fill itself in the ordinary way with earth, mud or whatever other substance is being excavated. After the shovel is filled, it is raised by means of the lifting cable A", tension being maintained on the hauling rope C'. The tension on the hauling rope C' is transmitted through the holding rope d over the sheave D' to the point of attachment to the shovel at d'. This tension on the hauling rope C' through the holding rope d operates to swing upwardly the forward end of the shovel as it leaves the ground to the position shown in Fig. 2. It is to be noted that as the shovel is being filled as shown in Fig. 1, the lifting cable A" is rather slack so that when in this position the tension from the hauling rope C' is transmitted through the hauling chains C to the shovel. After the shovel is filled, and ready to be lifted, a tension is put on the lifting cable A". The pull of this lifting cable is not directly vertical but is somewhat opposed to the direction of travel of the bucket as indicated in Fig. 2. As a result of this, such tension on the lifting cable A" serves to cause the tension on the hauling rope C' to be transferred from the hauling chains C to the holding rope d as the shovel is lifted. The result of this tension on the lifting cable A" and the holding rope d causes rotation of the shovel into the position as shown in Fig. 2, where it remains as long as the required tension is maintained on the hauling rope C'. The holding rope d keeps the shovel in the load retaining position as shown in Fig. 2 only when it is kept under tension by the tautness of the hauling rope C'. As soon as the tension on the hauling rope C' is released, therefore, the holding rope d slacks away permitting the shovel to swing down into the dumping position, as shown in Fig. 3, to discharge its contents.

The upward swinging of the forward end of the shovel, as it is lifted, causes liquid materials to be retained therein. A comparison of Figs, 1 and 2 will show that as the shovel leaves the ground, it rotates substantially 90°. Reference to the patents referred to above will show that the shovels there disclosed remain in substantially a horizontal position when carrying the load in the air. That is, the position of the shovel that it takes in receiving a load of material and the position it takes while carrying the material in the air are substantially the same. In my shovel disclosed herein, the same is substantially horizontal while taking a charge of material but immediately upon being raised from the ground the front end swings upwardly through substantially 90° so that soft and liquid materials will be retained in the shovel, being prevented from flowing out through the top by the covering to the shovel B'. As will be seen by reference to Fig. 2, the shovel, when thus suspended in the air, resembles a bucket.

I will now describe more in detail the construction of my improved shovel which makes its operation differ, as described above, from the operation of my shovels shown in my older patents above referred to. I have already referred to the covering B'. In addition to this, it is to be noted that in my improved shovel, the sheave D' lies in a direct line with the lifting cable A" and the pivotal connections 13 of the chains A to the shovel. This is accomplished by making the bail 11 with the parallel bars 11$^a$ carrying the sheave between them, and attaching the clevis 10 to the pin 11$^d$ which also serves as an axle for the sheave. It will be noted that in my older patents referred to above, the sheaves D' do not lie in the line of the lifting cable with its points of attachment to the shovel, but are located forward of this line. In my improved shovel, the parts of the device are so proportioned that the bucket will operate as described above.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a device of the class described; a shovel open at the forward end, and closed at the bottom, back, sides and top; means for hauling the shovel to load it; means for lifting the shovel; and means whereby simultaneous tension on the lifting means and the hauling means will cause the forward end of the shovel to swing upwardly, said means including a sheave located above the shovel, attached to the lifting means, and lying in the direct line of said lifting means and its point of attachment to the shovel, and a holding rope passing over said sheave and having one end attached to the hauling means and the other end attached to the shovel.

2. In a device of the class described; a shovel open at the forward end, and closed at the bottom, back, sides and top; means for hauling the shovel to load it; means for lifting the shovel; and means whereby simultaneous tension on the lifting means and the hauling means will cause the forward end of the shovel to swing upwardly, said means including a sheave located above the shovel, attached to the lifting means, and lying in the direct line of said lifting means and its point of attachment to the shovel, and a holding rope passing over said sheave and having one end attached to the hauling means and the other end attached to the forward end of the shovel.

3. In a device of the class described; a shovel open at the forward end, and closed at the bottom, back, sides and top; means for hauling the shovel to load it; means for lifting the shovel, said lifting means pivoted to said shovel behind the center of gravity thereof; and means whereby simultaneous tension on the lifting means and the hauling means will cause the forward end of the shovel to swing upwardly, said means including a sheave located above the shovel, attached to the lifting means, and lying in the direct line of said lifting means and its point of attachment to the shovel, and a holding rope passing over said sheave and having one end attached to the hauling means and the other end attached to the shovel.

4. In a device of the class described; a shovel open at the forward end, and closed at the bottom, back, sides and top; means for hauling the shovel to load it; means for lifting the shovel, said lifting means pivoted to said shovel behind the center of gravity thereof; and means whereby simultaneous tension on the lifting means and the hauling means will cause the forward end of the shovel to swing upwardly, said means including a sheave located above the shovel, attached to the lifting means, and lying in the direct line of said lifting means and its point of attachment to the shovel, and a holding rope passing over said sheave and having one end attached to the hauling means and the other end attached to the forward end of the shovel.

5. In a device of the class described; a shovel open at the forward end, and closed at the bottom, back, sides and top; means for hauling the shovel to load it; means for lifting the shovel, comprising a bail arranged over the shovel, suspending means having their upper ends attached to the ends of said bail and their lower ends pivotally attached to the shovel behind the center of gravity thereof, and a lifting cable attached to said bail; and means whereby simultaneous tension on the lifting cable and the hauling means will cause the forward end of the shovel to swing upwardly, said means including a sheave mounted on said bail at the point of attachment of the lifting cable to said bail, and a holding rope passing over said sheave and having one end attached to the hauling means and the other end attached to the forward end of the shovel.

6. In a device of the class described; a shovel open at the forward end, and closed at the bottom, back, sides and top; means for hauling the shovel to load it; means for lifting the shovel, comprising a rectangular frame bail arranged over the shovel, suspending means having their upper ends attached to the ends of said bail and their lower ends pivotally attached to the shovel behind the center of gravity thereof and a lifting cable attached to said bail; and means whereby simultaneous tension on the lifting cable and the hauling means will cause the forward end of the shovel to swing upwardly, said means including a sheave mounted on said bail, and a holding rope passing over said sheave and having one end attached to the hauling means and the other end attached to the forward end of the shovel.

7. In a device of the class described; a shovel open at the forward end, and closed at the bottom, back, sides and top; means for hauling the shovel to load it; means for lifting the shovel, comprising a rectangular frame bail arranged over the shovel, suspending means having their upper ends attached to the ends of said bail and their lower ends pivotally attached to the shovel behind the center of gravity thereof, and a lifting cable attached to said bail; and means whereby simultaneous tension on the lifting cable and the hauling means will cause the forward end of the shovel to swing upwardly, said means including a sheave mounted on said bail at the point of attachment of the lifting cable to said bail, and a holding rope passing over said sheave and having one end attached to the hauling means and the other end attached to forward end of the shovel.

Witness my hand and seal this 15th day of May, A. D. 1925.

JOHN W. PAGE. [L. S.]